(12) United States Patent
Itou

(10) Patent No.: US 7,697,722 B2
(45) Date of Patent: Apr. 13, 2010

(54) PORTABLE TERMINAL AND CHARACTER READING METHOD USING A PORTABLE TERMINAL

(75) Inventor: Toshihisa Itou, Yokohama (JP)

(73) Assignee: Casio Hitachi Mobile Communications Co., Ltd., Tokyo (JP)

( * ) Notice: Subject to any disclaimer, the term of this patent is extended or adjusted under 35 U.S.C. 154(b) by 1108 days.

(21) Appl. No.: 11/342,441

(22) Filed: Jan. 30, 2006

(65) Prior Publication Data

US 2006/0193517 A1    Aug. 31, 2006

(30) Foreign Application Priority Data

Jan. 31, 2005    (JP)    ............... 2005-023036

(51) Int. Cl.
*G06K 9/22*    (2006.01)
(52) U.S. Cl. ............... 382/103; 382/229; 382/313; 358/473
(58) Field of Classification Search ............... 382/103, 382/181, 229, 313; 358/473
See application file for complete search history.

(56) References Cited

U.S. PATENT DOCUMENTS

| | | | | |
|---|---|---|---|---|
| 6,470,094 | B1 * | 10/2002 | Lienhart et al. | 382/176 |
| 6,754,389 | B1 * | 6/2004 | Dimitrova et al. | 382/224 |
| 7,031,553 | B2 * | 4/2006 | Myers et al. | 382/289 |

FOREIGN PATENT DOCUMENTS

| | | |
|---|---|---|
| JP | 7-220025 | 8/1995 |
| JP | 11-103411 | 4/1999 |
| JP | 2000-207487 | 7/2000 |
| JP | 2001-128131 | 5/2001 |
| JP | 2002-111841 | 4/2002 |
| JP | 2004-023158 | 1/2004 |
| JP | 2004-129131 | 4/2004 |
| JP | 2005-020205 | 1/2005 |

OTHER PUBLICATIONS

Lienhart et al. "Localizing and Segmenting Text in Images and Videos." IEEE Transactions on Circuits and Systems for Video Technology, vol. 12, No. 4, Apr. 2002, pp. 256-268.*
Li et al. "Automatic Text Detection and Tracking in Digital Video." IEEE Transactions on Image Processing, vol. 9, No. 1, Jan. 2000, pp. 147-156.*
Crandall et al. "Robust Detection of Stylized Text Events in Digital Video." Proceedings of the Sixth International Conference on Document Analysis and Recognition, Sep. 10-13, 2001, pp. 865-869.*

* cited by examiner

*Primary Examiner*—Jon Chang
(74) *Attorney, Agent, or Firm*—Cohen Pontani Lieberman & Pavane LLP

(57) ABSTRACT

In a portable terminal, a character string clipping section clips an image of a character string from image data photographed by a screen image pickup device. A character recognition section recognizes the clipped image of the character string and acquires a character code string corresponding to the clipped character string. A character string tracking section sets the acquired character code string as a tracking object character string when the tracking object character string extends beyond the photographable area as well as tracking the tracking object character string or a marker character string ultimately used as an input character string while repeatedly updating the marker character string. A display section highlights the tracking object character string when the tracking object character string extends beyond the photographable area of the image pickup device and displays an arrow showing the relative direction.

22 Claims, 5 Drawing Sheets

FIG. 4

| | x<0 | x=0 | 0<x |
|---|---|---|---|
| y<0 | ↘ | ↓ | ↙ |
| y=0 | → | | ← |
| 0<y | ↗ | ↑ | ↖ |

PORTABLE TERMINAL AND CHARACTER READING METHOD USING A PORTABLE TERMINAL

CROSS-REFERENCE TO RELATED APPLICATION

This application is based upon and claims the benefit of priority from the prior Japanese Patent Application No. 2005-023036, filed Jan. 31, 2005, the entire contents of which is incorporated herein by reference.

BACKGROUND OF THE INVENTION

1. Field of the Invention

The present invention generally relates to a portable terminal, for example, a cellular phone, a Personal Handyphone System (PHS), a Personal Digital Assistant (PDA), etc. More particularly, the present invention relates to a portable terminal equipped with a camera comprising a photography function and a character reading method together with a character reading program using a portable terminal.

2. Description of the Related Art

Recently, in portable terminals, such as a cellular phone, PHS, etc., the occasions for inputting character data in a portable terminal has been increasing. Most occasions include creating and sending E-mail messages, inputting a Uniform Resource Locator (URL) to access the Internet and inputting a keyword term to use a search engine site on the Internet.

However, because of a portable terminal's compact size, only a small number of keys can be installed, which makes it difficult to mount a QWERTY arranged keyboard (QWERTY refers to the order of the top row of letters) suitable for inputting characters widely used on a personal computer (PC).

Therefore, in a portable terminal, commonly a plurality of characters (a letter, number or other symbol) is assigned to one key and the character inputted changes by the number of times the assigned key is depressed. However, in the previously mentioned portable terminal in which a plurality of characters is assigned to one key and the character inputted changes by the number of times the assigned key is depressed, many successive key depressions are required for inputting a character which makes manipulation complicated and takes time to accomplish.

Accordingly, in the conventional prior art (for example, refer to Japanese Laid-Open (Kokai) Patent Application No. 2002-111841 titled "PORTABLE COMMUNICATION TERMINAL AND CHARACTER READER"), technology has been proposed which uses an image of a character photographed (optically read) by a screen image pickup device and supplied by acquiring the corresponding character code.

However, in the conventional prior art mentioned above, in order to photograph a character using the portable terminal equipped with an imaging device, the portable terminal must be placed considerably close to the character and any slight movement of the portable terminal greatly influences the photography. Particularly, when inputting consecutive characters, since the portable terminal must shift after recording a character, there is a problem of easily losing sight of the immediately preceding photographed characters.

SUMMARY OF THE INVENTION

Therefore, the object of the present invention is to provide a portable terminal and a character reading method together with a character reading program using a portable terminal which can photograph and easily read consecutive words or character strings by tracking the immediately preceding photographed and inputted characters.

In order to achieve the above-mentioned object, the portable terminal according to the present invention comprises a screen image pickup means for photographing text; a character clipping means for clipping an image containing at least one character string from an image of text photographed by the screen image pick up means; a character recognition means for recognizing a character string contained in the image clipped by the character clipping means and acquiring a character code string of the clipped character string; and a character string tracking means for comparing a current character code string acquired by the character recognition means and a previous character code string acquired from a character string contained in a clipped image of immediately preceding text captured by the screen image pickup means and for setting the current character code string as a tracking object character string when a character code line is at least partially the same.

Additionally, in order to achieve the above-mentioned object, the character reading method according to the present invention, the character reading method for a portable terminal having an image pickup section comprises the steps of photographing text repeatedly by the image pickup section at a predetermined time interval; clipping an image containing at least one character string from an image of text photographed; recognizing a character string contained in the clipped image and acquiring a character code string of the clipped character string; and comparing the acquired character code string from the character string clipped from the image of text photographed immediately preceding and setting the character string of the character code string as a tracking object character string when a character code line is at least partially the same; and setting the character code string of a character string as the tracking object character string which is ultimately used as an input character string.

Furthermore, in order to achieve the above-mentioned object of the present invention, the character reading program executed by a processor according to a portable terminal having an image pickup section comprises the steps of photographing text by the image pickup section; clipping an image containing at least one character string from an image of text photographed; recognizing a character string contained in the clipped image and acquiring a character code string of the clipped character string; comparing the acquired character code string from the character string clipped from the image of text photographed immediately preceding and setting the character string of the character code string as a tracking object character string when a character code line is at least partially the same; and setting the character code string of a character string as the tracking object character string which is ultimately used as an input character string.

According to the present invention, the advantage obtained is that a specific character string can be easily read from among consecutively photographed words or character strings.

The above and further objects and novel features of the present invention will more fully appear from the following detailed description when the same is read in conjunction with the accompanying drawings. It is to be expressly under-

BRIEF DESCRIPTION OF THE DRAWINGS

FIG. 4 is a conceptual diagram showing an example of the arrow displayed on the display section corresponding to a marker character string position information P (x,y) value;

DETAILED DESCRIPTION OF THE PREFERRED EMBODIMENT

Hereinafter, the preferred embodiment of the present invention will be explained with reference to the drawings. Additionally, hereinafter a case will be explained where the text to be read is described in English. Also, the portable terminal according to the preferred embodiment reads a character string for each word.

A. Configuration of the Preferred Embodiment

Figure 1:
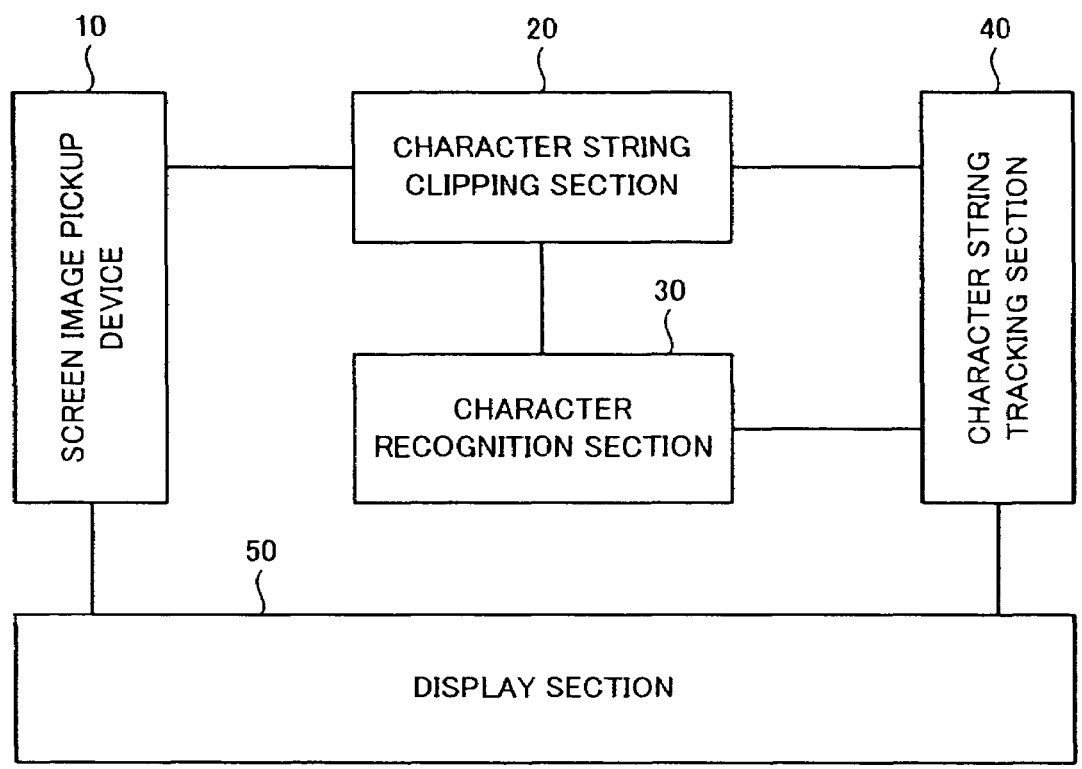
FIG. 1 is a block diagram showing the configuration of the portable terminal related to the preferred embodiment of the present invention.

FIG. 1 is a block diagram showing the outline configuration of the portable terminal related to the preferred embodiment of the present invention. As seen in FIG. 1, the portable terminal comprises a screen image pickup device 10, a character string clipping section 20, a character recognition section 30, a character string tracking section 40 and a display section 50. The screen image pickup device 10 photographs an image of text as a still image. The character string clipping section 20 receives the image data from the screen image pickup device 10 and the image of a character string is clipped (extracted) from that data. Subsequently, the character string clipping section 20 acquires character string image position information showing where the image of that character string is located in the image data and image size information showing the image size of the character string received from the screen image pickup device 10. Here, with reference to a character string, for example, in the case of a language in which the recognition objects are divided by a space between words, such as English words, etc., the portion from the space information until the following space (inter-word space) is specified as a word separator. Also, regarding other languages, a character or a word is specified corresponding to the individuality of each language.

The character recognition section 30 comprises what is termed as an Optical Character Reader (OCR) capability and acquires the character code string corresponding to that character string from the image of the character string and that character string image position information received from the character string clipping section 20. More specifically, for example, a case whereby the characters "abc" within the image data are "recognized" will be explained. First, the position information within the image data "abc" is specified (character string extraction). Next, "abc" is divided into "a", "b" and "c". Subsequently, "a" is converted into a predetermined parameter value (for example, the parameterized value setting of a character white portion as "0" and black portion as "1" in relation to the line segment structure of that character as observed lengthwise, widthwise and diagonally). Then, a corresponding character code containing the most equivalent parameter value in relation to the converted parameter value is selected from a recognition dictionary (not shown).

The recognition dictionary memorizes the parameter values and character codes corresponding to these parameter values in a paired data structure. The characters codes may include an alphabet, Japanese kanji, hiragana, katakana, Hangul characters (Korean), Taiwanese, Chinese, Arabic characters, Thai characters (Thailand), etc. Additionally, in cases where there are a large number of characters, such as Japanese characters, Korean characters, etc., since the file size increases when the data is stored regarding all the characters in one dictionary, each language may be divided and stored in a plurality of recognition dictionaries. For example, in the case of Japanese, the characters of the first level and the second level as defined by the Japanese Industrial Standard (JIS) may be stored independently.

The character string tracking section 40 compares the character code of two character strings together with the character string image position information, image size information, etc. received from the character recognition section 30 and judges whether or not they are the same. When entirely or partially the same, the character code string recognized as a marker character string in order to track a tracking object character string or this tracking object character string is ultimately used as an input character string. Also, according to the character string image position information and image size information, the character string tracking section 40 judges whether or not a tracking object character string or a marker character string extends beyond the photographable range or possibly extends beyond the photographable range of the screen image pickup device 10. In cases where a tracking object character string or a marker character string extends beyond the photographable range or in cases where anticipated to extend beyond the photographable range of the screen image pickup device 10, a command is issued to the character string clipping section 20 so that the character string adjacent to the tracking object character string or marker character string is clipped in order to be in the photographable range of the screen image pickup device 10. The display section 50 displays the image data received from the screen image pickup device 10. In cases where character string image position information for a tracking object character string is received from the character string tracking section 40, the character string image is highlighted. The direction is shown in cases where direction information with a tracking object character string has been received from the character string tracking section 40. In addition, the character string clipping section 20, the character recognition section 30 and the character string tracking section 40 shown in FIG. 1 may be actualized as CPU software.

B. Operation of the Preferred Embodiment

Figure 2:
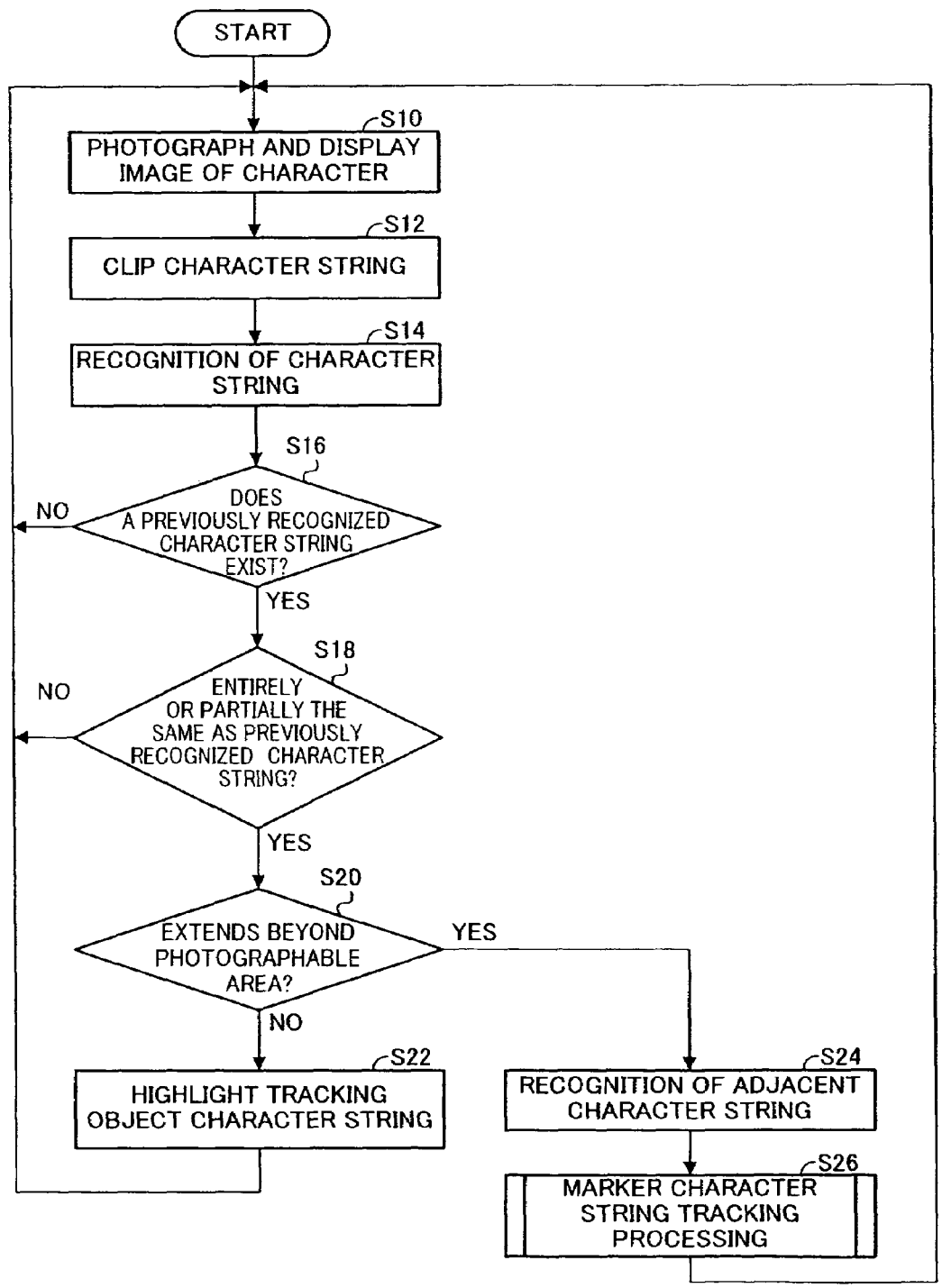
FIG. 2 is a flow chart showing the operation of the portable terminal related to the preferred embodiment of the present invention.
Figure 3:
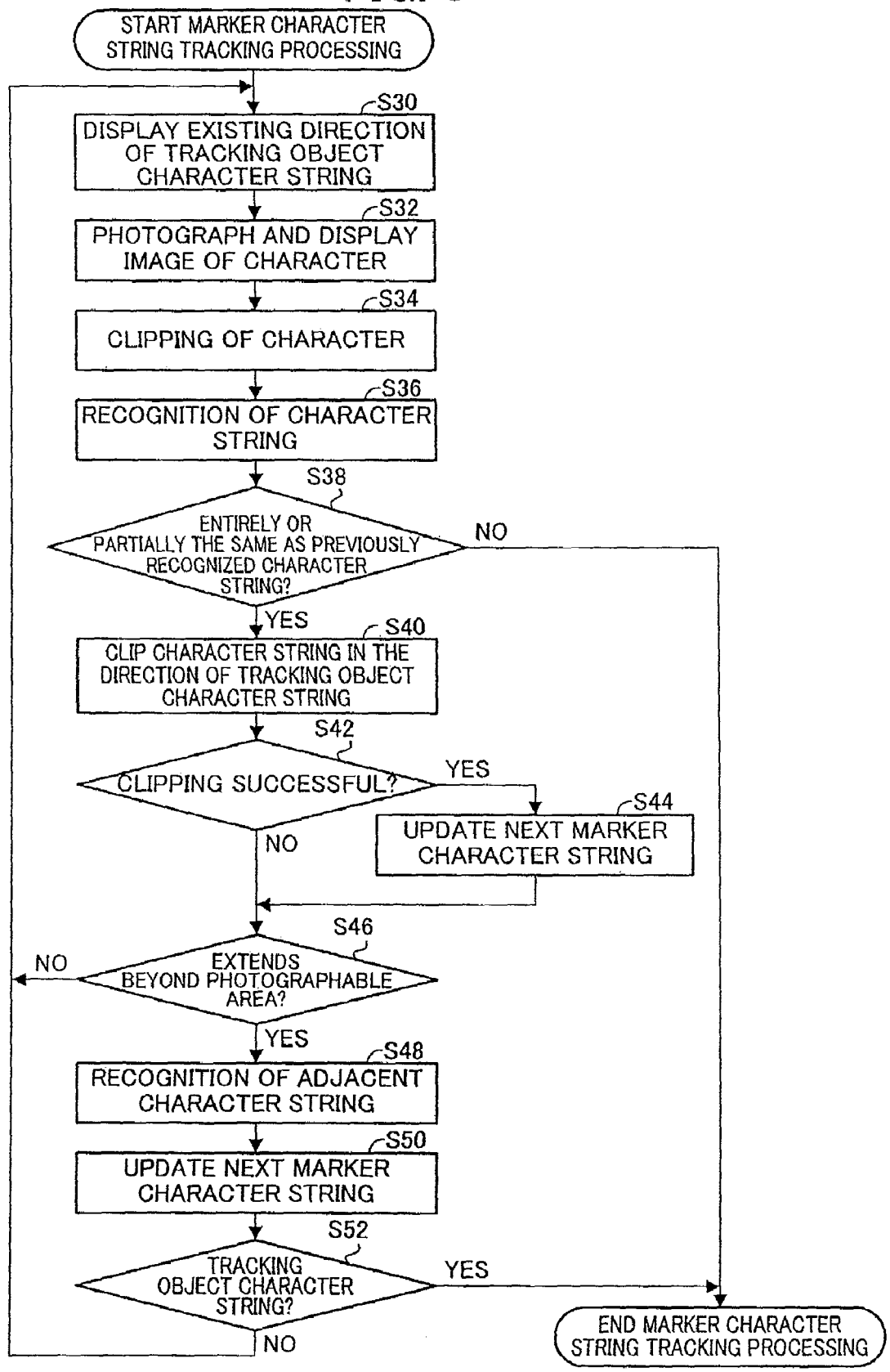
FIG. 3 is a flow chart showing the operation of the portable terminal related to the preferred embodiment of the present invention.

Next, the operation of the above-mentioned preferred embodiment will be explained with reference to the drawings. Here, FIG. 2 and FIG. 3 are flow charts showing the operation of the portable terminal related to the preferred embodiment. When a terminal user copies text with the screen image pickup device 10 (Step S10), the screen image pickup device 10 will transfer the still image data to the character string clipping section 20 and the display section 50. The display section 50 displays the still image data (Step S10). The character string clipping section 20 clips the image of a word (Step S12) and transfers the clipped image data and related character string image position information to the character recognition section 30.

The character recognition section 30 executes recognition of that character string from the image of a word (Step S14) and acquires the corresponding character code string. The character code string and the character string image position information are then transferred to the character string tracking section 40. Subsequently, the character string tracking section 40 receives and memorizes the character code string and the character string image position information. Afterwards, the character string tracking section 40 examines for the existence of the same previously received character code string and the character string image position information (Step S16). Then, in cases where there is no same previously received character code string and character string image position information, the operation reverts to Step S10 and the above-mentioned processing will be repeated.

On the other hand, in cases where there is a same previously received character code string and character string image position information, the previously received character code string and the current character code string received are compared as a character code unit. The character code string is examined to determine whether or not entirely or partially the same (part of the current character code string is contained in a previous character code string) (Step S18). When not the same, the operation reverts to Step S10 and the above-mentioned processing will be repeated. On the other hand, if entirely or partially the same, the word is recognized as a tracking object character string. Then, according to the character string image position information and the image size information of that tracking object character string, the character code string is examined to determine whether or not the related image data extends beyond the photographable area (the effective photographable area depending on the lens, the image pickup device, etc.) of the screen image pickup device 10 (Step S20). Then, if the related image data does not extend beyond the photographable area, the tracking object character string is highlighted (Step S22). Afterwards, the operation reverts to Step S10 and the above-mentioned processing will be repeated. Accordingly, photographing of text will be repeated at Step S10 in a cycle corresponding to the throughput by the character string clipping section 20, the character recognition section 30 and the character string tracking section 40. As a result, photographing will be repeatedly performed at a predetermined time interval (cycle).

On the other hand, when the related image data of the tracking object character string extends beyond the photographable area of the screen image pickup device 10, a command will be issued to the character string clipping section 20 so that the word adjacent to a tracking object character string is clipped in order to be within the photographable area of the screen image pickup device 10. The character string clipping section 20 clips the word adjacent to the tracking object character string in order to be within the photographable area of the screen image pickup device 10 and then transfers the clipped image data with the related character string image position information to the character recognition section 30. The character recognition section 30 executes recognition of the character string from the image of a word and acquires that corresponding character code string. The character code string and the character string image position information are then transferred to the character string tracking section 40 (Step S24). The character string tracking section 40 recognizes and memorizes the character code string of the word for the adjacent tracking object character string together with the related character string image position information as marker character string information. The operation then proceeds to marker character string tracking processing (Step S26).

Figure 4:
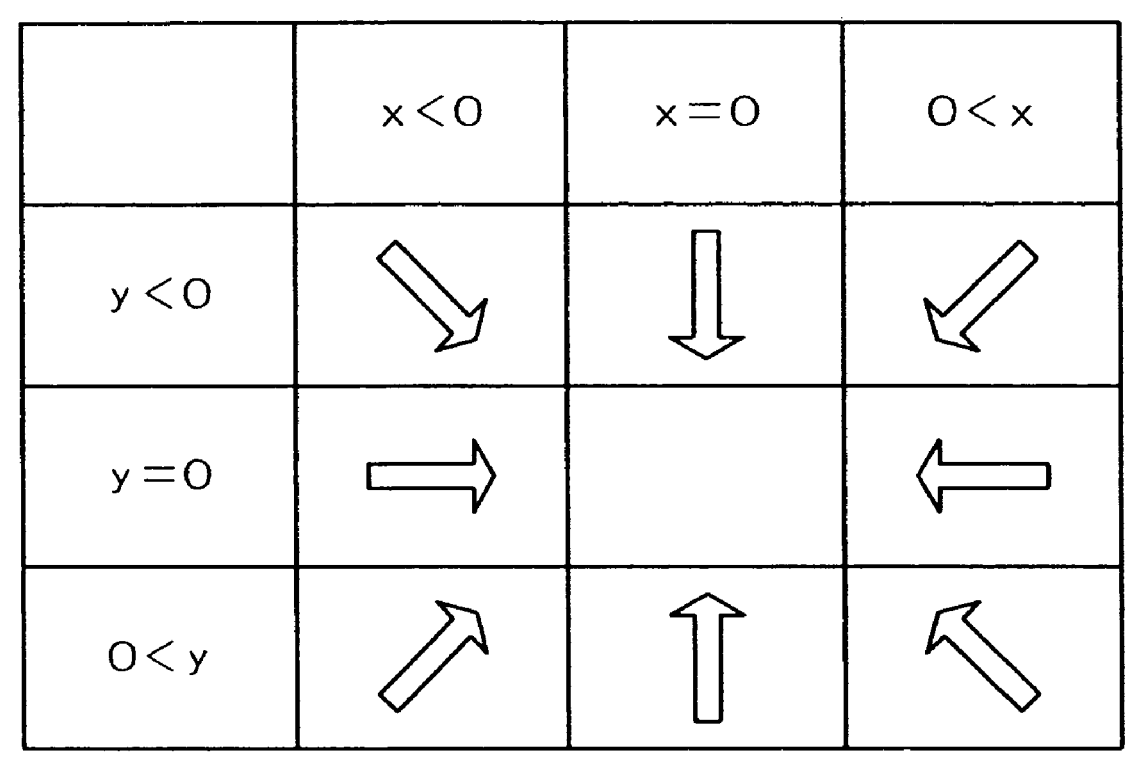

When the operation proceeds to the marker character string tracking processing shown in FIG. 3, the character string tracking section 40 memorizes how many lines that marker character string has shifted position above and below a tracking object character string as well as how many words that marker character string has shifted position sideways. The position information in the case of a marker character string is "x" word downward from a tracking object character string and shifted position "y" line to the right expressed as marker character string position information P (x, y). In the preferred embodiment, in order to graphically show in which direction a marker character string is positioned relative to a tracking object character string, an arrow indicating the current direction is displayed. Therefore, as seen in the table of FIG. 4 which contains, the above-mentioned arrow (marker), the direction of a marker character string relative to a tracking object character string is memorized corresponding to the combination of x, y values to derive the marker character string position information P (x, y). Subsequently, the operation examines which direction a tracking object character string from P (x, y) is pointed. The arrow facing that direction is then acquired from the table in FIG. 4 and displayed on the display section 50 (Step S30). Next, a character string is photographed in the screen image pickup device 10 and directs processing to proceed (Step S32).

The screen image pickup device 10 photographs a character string and transfers the image data to the character string clipping section 20. The character string clipping section 20 clips the character string nearest the position indicated in the character string image position information of a marker character string. This image data and related image position information are transferred to the character recognition section 30 (Step S34). The character recognition section 30 recognizes the image of the received character string and the corresponding character code string is acquired (Step S36). Next, the character code string and the character string image position information are transferred to the character string tracking section 40.

The character string tracking section 40 compares the character code string of previously recognized marker character strings with the currently received character code string and examines whether or not entirely or partially the same (Step S38). When not the same, the character string tracking section 40 will discard the character code string of the tracking object character string and related character string image position information, and further the character code string of the marker character string and related character string image position information. Then, marker character string tracking processing is ended and the operation reverts to Step S10 of FIG. 2.

On the other hand, when a character code string of a previously recognized marker character string and the currently received character code string are the same, the character string tracking section 40 issues a command to the character string clipping section 20 so that the current character string is clipped in the direction of the tracking object character string adjoining the marker character string. Subsequently, the character string is clipped by the character string clipping section 20 (Step S40) and then judged whether or not the image data of the character string has been successfully clipped (Step S42). Next, if the character string clipping section 20 cannot successfully clip the character string, the marker character string is left in its present state and the operation advances to following processing (Step S46).

Conversely, if the character string clipping section 20 can successfully clip the character string, the image data and related character string image position information are transferred to the character recognition section 30. The character recognition section 30 acquires the corresponding character code string from the image data of the received character code string. Next, the character code string and related character string image position information are transferred to the character string tracking section 40. From the received character code string and character string image position information, the character string tracking section 40 examines which direction the character string is in relation to the marker character string, updates P (x, y) and sets that character string as the most current marker character string (Step S44).

Regardless of the existence of an updated marker character string, the character string tracking section 40 examines whether or not the image data of a marker character string extends beyond the photographable area of the screen image pickup device 10 according to the character string image position and the image size information of that marker character string (Step S46). When the image data of a marker character string does not extend beyond the photographable area, the operation reverts to Step S30 and the above-mentioned processing will be repeated.

Conversely, when the image data of a marker character string does extend beyond the photographable area, the character string tracking section 40 recognizes the word adjacent to the marker character string and within the photographable area of the screen image pickup device 10 (Step S48). Specifically, the character string tracking section 40 issues a command to the character string clipping section 20 so that the word next to the marker character string is clipped and within the photographable area of the screen image pickup device 10. Subsequently, the character string clipping section 20 clips the word adjacent to the marker character string and within the photographable area of the screen image pickup device 10. The clipped image data and related character string image position information are transferred to the character recognition section 30.

The character recognition section 30 recognizes the character string from the image of the word and acquires that corresponding character code string. Next, the character code string and character string image position information are transferred to the character string tracking section 40. From the received character code string and character string image position information, the character string tracking section 40 examines which direction the character string is in relation to the marker character string, updates P (x, y) and sets that character string as the most current marker character string (Step S50).

Subsequently, the operation judges whether or not the marker character string is a tracking object character string (Step S52). Specifically, when P (x, y) constitutes x=0 and y=0, the character string tracking section 40 sets that marker character string as a tracking object character string. Then, the marker character string tracking processing is ended and the operation reverts to Step S10 of FIG. 2. On the other hand, as for P (x, y) when x is not 0 and y is not 0 the operation reverts to Step S30 of the marker character string tracking process and tracking of a marker character string will be continued.

Figure 5A:
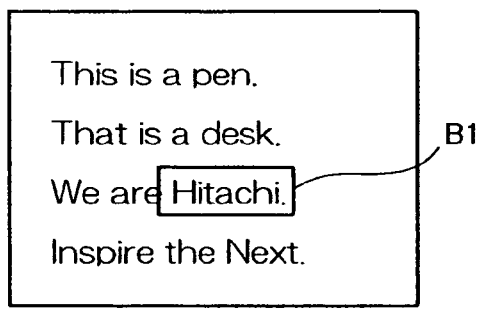
FIGS. 5A~5G are mimetic diagrams showing the operation of the portable terminal related to the preferred embodiment of the present invention.
Figure 5B:
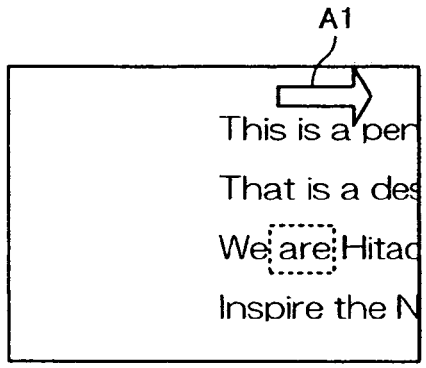

Next, an operation ex-ample of the portable terminal according to the above-stated preferred embodiment will be explained with reference to FIGS. 5A~5G. When English is photographed, for example, the characters "Hitachi" near the center of an image will be recognized as a tracking object character string which is enclosed and highlighted with frame B1 (FIG. 5A). Subsequently, in cases where there is terminal movement to the left caused by hand shake, etc., the tracking object character string will extend beyond the photographable area and the word "are" which is adjacent to "Hitachi" will be recognized as the marker character string. The marker character string position information P (x, y) becomes P (−1, 0) and the current direction of the tracking object character string is shown by the arrow A1 (FIG. 5B). In this situation, since the current direction of the tracking object character string is to the right, the character string "Hit a" on the right side adjacent to "are" will be recognized. The marker character string position information P (x, y) becomes P (0, 0).

Figure 5C:
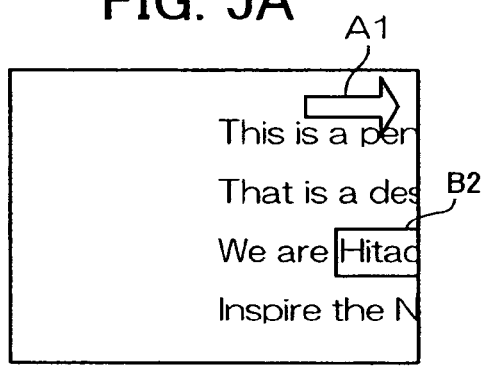

Accordingly, "Hita" will be recognized as the tracking object character string which is enclosed and highlighted with frame B2 (FIG. 5C). However, since "Hita" is next to the word "are" which extends beyond the photographable area, it will be recognized as the marker character string. The marker character string position information P (x, y) becomes P (−1, 0) and the current direction of the tracking object character string is shown by the arrow A1 (FIG. 5B). In this case, the operation of FIGS. 5B and 5C will be repeated.

Figure 5D:
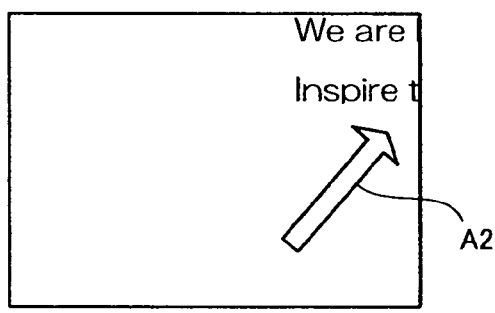

Furthermore, in cases where there is terminal movement to the lower left caused by hand shake, etc., since the marker character string "are" extends beyond the photographable area, the character string "Inspire" which is adjacent and exists within the photographable area is set as the most current marker character string. In this case, since "Inspire" exists below, the marker character string position information P (x, y) becomes P (−1, 1) and the current direction of the tracking object character string is shown by the arrow A2 (FIG. 5D)

Figure 5E:
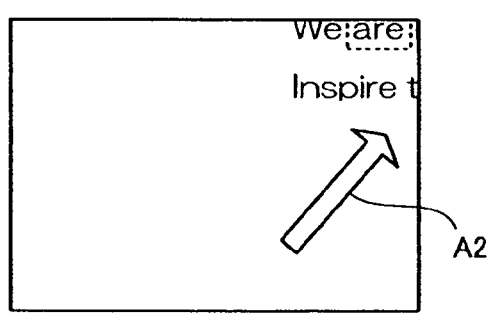

Next, the characters adjacent to the marker character string which exist in the direction of the tracking object character string are recognized. In this case, because it is "are," this is updated as the most current marker character string. The marker character string position information P (x, y) becomes P (−1, 0) (FIG. 5E). However, since the marker character string "are" extends beyond the photographable area, the character string "Inspire" which exists and adjacent within the photographable area is set as the most current marker character string. The marker character string position information P (x, y) becomes P (−1, 1) (FIG. 5D). Hereafter, the operation of FIGS. 5D and 5E will be repeated until terminal movement.

Figure 5F:
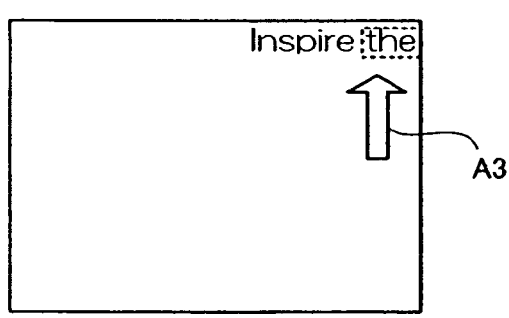

Next, in order for a user to search for a tracking object character string, the terminal is moved to the right from the state of FIG. 5E. Accordingly, the character string "the" which exists in the direction of the tracking object character string and adjacent to the character marker string is recognized. Since the recognized character string "the" exists to the right of the marker character string, the marker character string position information P (x, y) becomes P (0, 1) and the recognized character string "the" is set as the most current marker character string (FIG. 5F). At this stage, since there is no character string within the photographable area which adjoins in the direction with the target object character string, "the" remains as the marker character string and the current direction of the tracking object character string is shown by the arrow A3.

Figure 5G:
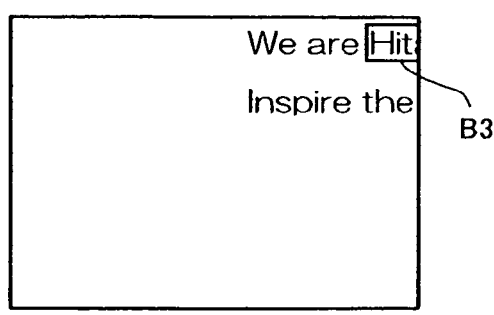

Furthermore, since the direction of the tracking object character string points upward, the user moves the terminal upward. When a character string exists in the direction of the tracking object character string and adjacent to the marker character string, "Hi" is recognized. Since this character string "Hi" exists above the marker character string, the marker character string position information P (x, y) is updated and expressed as P (0, 0). Because of being constituted as P (0, 0), this character string "Hi" will be set as the tracking object character string which is enclosed and highlighted with frame B3 (FIG. 5G).

Hereinafter, as mentioned above, in real-time even if the immediately preceding photographed word or character string (tracking object character string) displayed on the display section 50 moves due to substantial terminal movement by hand shake, etc., the character string adjacent to that tracking object character string is recognized as the marker character string and the tracking object character string is highlighted. Furthermore, because of the repeat operation showing the direction where the tracking object character string exists with a graphical arrow from the positional relationship of the current marker character string and the tracking object character string, the immediately preceding photographed word or character string (tracking object character string) can be easily discovered.

Additionally, in the preferred embodiment, when the character string tracking section 40 compares two words, the character string image position information for two words is compared and not by a comparison of the character code strings. As long as the difference in the widthwise direction of the character string image position for two words is less than the size of the widthwise direction of one character, and the difference in the lengthwise direction of the character string image position for two words is less than the size of the lengthwise direction of one character, they are judged as the same word.

Moreover, when the character string tracking section 40 compares two words, the image of two words is compared and not by comparison of character code strings. As long as the difference in the width direction of the image size for two words is less than the width direction of one character and the difference in the lengthwise direction of the image size for two words is less than the lengthwise direction of one character, they are as the same word.

Besides, the character string tracking section 40 compares two words by comparing the character string image position information for the above-mentioned two words and comparing the image size for the above-mentioned two words. In the event that both are judged in these two types of comparisons to be the same word, they are judged as the same word.

Also, in the preferred embodiment, the character string clipping section 20 clips a word based on the assumption of English. In the case of clipping a word in an intricate language, such as Japanese, the present invention is also effective in clipping as separation at the boundary line of complicated characters and simple characters, such as kanji and hiragana.

According to the preferred embodiment mentioned above, when photographing characters with the screen image pickup device 10, the immediately preceding word or character string photographed can be easily recognized. Specifically, even if losing sight of the immediately preceding photographed word or character string due to substantial terminal movement by hand shake, etc., the immediately preceding photographed word or character string can be easily discovered by an arrow which indicates the direction of the immediately proceeding photographed word or character string shown on the display section 50.

Furthermore, although the character reading program according to the portable terminal which embodies one preferred embodiment of the present invention and is stored in the memory of the portable terminal (for example, ROM, etc.), this character reading program is stored on a recording medium. Thus, when implementing, for example manufacture, sale, etc., only the character reading program itself must be protected. The protection form of the program in such a situation is intended to be protected with the form of the recording medium in which the character reading program is stored.

While the present invention has been described with reference to the preferred embodiments, it is intended that the invention be not limited by any of the details of the description therein but includes all the embodiments which fall within the scope of the appended claims.

What is claimed is:

1. A portable terminal, comprising:
a screen image pickup means for photographing text;
a character clipping means for clipping an image containing at least one character string from an image of text photographed by the screen image pickup means;
a character recognition means for recognizing a character string contained in the image clipped by the character clipping means and acquiring a character code string of the clipped character string; and
a character string tracking means for comparing a current character code string acquired by the character recognition means and a previous character code string acquired from a character string contained in a clipped image of immediately preceding text captured by the screen image pickup means and for setting the current character code string as a tracking object character string when a character code line of the current character code string is at least partially the same as a character code line of a previous character code string.

2. The portable terminal according to claim 1, wherein the character code string set as the tracking object character string by the character string tracking means is ultimately used as an input character string.

3. The portable terminal according to claim 1, further comprising a display means for highlighting of the character string set as the tracking object character string by the character string tracking means upon image of the text when displaying the image of text photographed by the screen image pickup means.

4. The portable terminal according to claim 1, wherein the screen image pickup means repeatedly photographs the text at a predetermined time interval.

5. The portable terminal according to claim 1, wherein the character string clipping means acquires character string image position information of the image of the character string showing where the image photographed by the screen image pickup means is positioned when the screen image pickup means clips the image of a character string from the image photographed; and
wherein the character string tracking means judges whether or not the tracking object character string extends beyond the photographable area of the screen image pickup means based on the character string position information and, when the tracking object character string extends beyond the photographable area of the screen image pickup means, the character string tracking means directs clipping of the character string adjacent to the position indicated by the character string image position information to the character string clipping means and so as to be within the photographable area of the screen image pickup means.

6. The portable terminal according to claim 1, wherein the character string clipping means further acquires image size information showing image size of the clipped character string upon clipping the image of a character string from the image photographed by the screen image pickup means; and wherein the character string tracking means judges whether or not character strings are the same position or the same image size based on the character string image position information and the image size information when judging if the same character string, wherein when the character strings to compare are in the same position or the same image size are judged as being the same character string.

7. The portable terminal according to claim 1, wherein the character string clipping means further acquires image size information showing the image size of the clipped character string upon clipping the image of a character string from the image photographed by the screen image pickup means; and the character string tracking means judges whether or not character strings are the same position and the same image size based on the character string image position information and the image size information when judging if the same character string, wherein when the character strings to compare are in the same position and the same image size are judged as being the same character string.

8. The portable terminal according to claim 5, wherein the character string tracking means directs clipping of the character string adjacent to the position indicated by the character string image position information to the character string clipping means so as to be within the photographable area of the screen image pickup means, which clips the character string existing adjacent to the tracking object character string by the character string clipping means and recognizes the character string existing adjacent to the tracking object character string as a marker character string for tracking of the tracking object character string.

9. The portable terminal according to claim 8, wherein the character string tracking means judges whether or not the marker character string extends beyond the photographable area of the screen image pickup means based on the character string position information of the recognized marker character string, wherein when the marker character string extends beyond the photographable area, the screen image pickup means directs clipping of the character string adjacent to the position indicated by the character string image position information to the character string clipping means so as to be within the photographable area of the screen image pickup means; and wherein as a result of clipping the character string adjacent to the tracking object character string by the character string clipping means, the character string adjacent to the marker character string will be recognized as the next marker character string.

10. The portable terminal according to claim 8, wherein the character string tracking means acquires direction information showing the current direction of the marker character string relative to the tracking object character string based on the character string position information of the marker character string and the character string position information of the tracking object character string.

11. The portable terminal according to claim 10, wherein the display means display indicates recognized direction with the tracking object character string based on the direction information acquired by the character string tracking means.

12. The portable terminal according to claim 8, wherein the character string tracking means issues a command so that the adjacent character string is clipped in the direction containing the tracking object character string from the position containing the marker character string to the character string clipping means, wherein the character string tracking means, upon clipping the marker character string by the character string clipping means, sets the most current marker character string and judges the direction containing the tracking object character string from the character string image position information of the most current marker string.

13. A character reading method for a portable terminal having an image pickup section, a character clipping section, a character recognition section, and a character string tracking section, comprising the steps of:

photographing text repeatedly by the image pickup section at a predetermined time interval;

clipping, at the character clipping section, an image containing at least one character string from an image of text photographed by the image pickup section;

recognizing, at the character recognition section, a character string contained in the clipped image and acquiring a character code string of the clipped character string;

comparing, at the character string tracking section, the acquired character code string from the character string clipped from the image of text photographed immediately preceding and setting, at the character string tracking section, the character string of the character code string as a tracking object character string when a character code line of the current character code string is at least partially the same as a character code line of a previous character code string; and setting, at the character string tracking section, the character code string of a character string as the tracking object character string which is ultimately used as an input character string.

14. The character reading method according to claim 13, wherein the portable terminal further has a display section, the method further comprising the step of:

highlighting, at the display section, of the character string set as the tracking object character string upon the image of text when displaying the image of text photographed.

15. The character reading method according to claim 13, wherein the portable terminal further has a display section, the method further comprising the steps of:

acquiring, at the character clipping section, character string image position information of the tracking object character string showing where the image of the character string positions on the image photographed when clipping the image of a character string from the image photographed by the image pickup section;

judging, at the character string tracking section, whether or not the tracking object character string extends beyond the photographable area of the image pickup section based on the character string position information of the tracking object character string and clipping, at the character clipping section, the character string adjacent to the position indicated by the character string image position information of the tracking object character string so as to be within the photographable area when the tracking object character string extends beyond the photographable area;

recognizing, at the character string tracking section, the character string existing adjacent to the tracking object character string and within the photographable area as a marker character string for tracking of the tracking object character string;

acquiring, at the character string tracking section, direction information showing the current direction of the marker character string relative to the tracking object character string based on the character string position information of the marker character string and the character string position information of the tracking object character string; and indicating, at the display section, recognized direction with the tracking object character string based on the acquired direction information.

16. The character reading method according to claim 13, further comprising the steps of:

acquiring, at the character clipping section, image size information showing image size of the clipped character string upon clipping the image of a character string from the image photographed by the image pickup section;

judging, at the character string tracking section, whether or not character strings are the same position or the same image size based on the character string image position information and the image size information when judging if the same character string; and judging, at the character string tracking section, as being the same character string when the character strings to compare are in the same position or the same image size.

17. The character reading method according to claim 13, further comprising the steps of:

acquiring, at the character clipping section, image size information showing image size of the clipped character string upon clipping the image of a character string from the image photographed by the image pickup section;

judging, at the character string tracking section, whether or not character strings are the same position and the same image size based on the character string image position information and the image size information when judging if the same character string; and judging, at the character string tracking section, as being the same character string when the character strings to compare are in the same position and the same image size.

18. The character reading method according to claim 13, further comprising the steps of:

judging, at the character string tracking section, whether or not the marker character string extends beyond the photographable area of the image pickup section based on the character string position information of the recognized marker character string;

clipping, at the character string clipping section, the character string adjacent to the position indicated by the character string image position information so as to be within the photographable area when the marker character string extends beyond the photographable area; and recognizing, at the character string tracking section, the character string adjacent to the marker character string as the next marker character string.

19. The character reading method according to claim 13, wherein upon clipping the character string adjacent to the direction containing the tracking object character string from the position containing the marker character string, the clipped character string will be set, a the character string tracking section, as the most current character string; and judges, at the character string tracking section, the direction containing the tracking object character string from the character string image position information of the most current marker string.

20. A character reading program stored in a memory of a portable terminal having an image pickup section, a character clipping section, a character recognition section, and a character string tracking section, the program comprising:

program code for photographing text by the image pickup section;

program code for clipping, at the character clipping section, an image containing at least one character string from an image of text photographed by the image pickup section;

program code for recognizing, at the character recognition section, a character string contained in the clipped image and for acquiring a character code string of the clipped character string; and program code for comparing, at the character string tracking section, the acquired character code string from the character string clipped from the image of text photographed immediately preceding and for setting, at the character string tracking section, the character string of the character code string as a tracking object character string when a character code line of the current character code string is at least partially the same as a character code line of a previous character code string; and program code for setting, at the character string tracking section, the character code string of a character string as the tracking object character string which is ultimately used as an input character string.

21. The character reading program according to claim 20, wherein the portable terminal further has a display section, the program further comprising:

program code for highlighting, at the display section, of the character string set as the tracking object character string upon the image of text when displaying the image of text photographed.

22. The character reading program according to claim 20, wherein the portable terminal further has a display section, the program further comprising:

program code for acquiring, at the character clipping section, character string image position information of the tracking object character string showing where the image of the character string positions on the image photographed when clipping the image of a character string from the image photographed by the image pickup section;

program code for judging, at the character string tracking section, whether or not the tracking object character string extends beyond the photographable area of the image pickup section based on the character string position information of the tracking object character string;

program code for clipping, at the character clipping section, the character string adjacent to the position indicated by the character string image position information of the tracking object character string so as to be within the photographable area when the tracking object character string extends beyond the photographable area;

program code for recognizing, at the character string tracking section, the character string existing adjacent to the tracking object character string and within the photographable area as a marker character string for tracking of the tracking object character string;

program code for acquiring, at the character string tracking section, direction information showing the current direction of the marker character string relative to the tracking object character string based on the character string position information of the marker character string and the character string position information of the tracking object character string; and program code for indicating, at the display section, recognized direction with the tracking object character string based on the acquired direction information.

* * * * *